Figure 1:
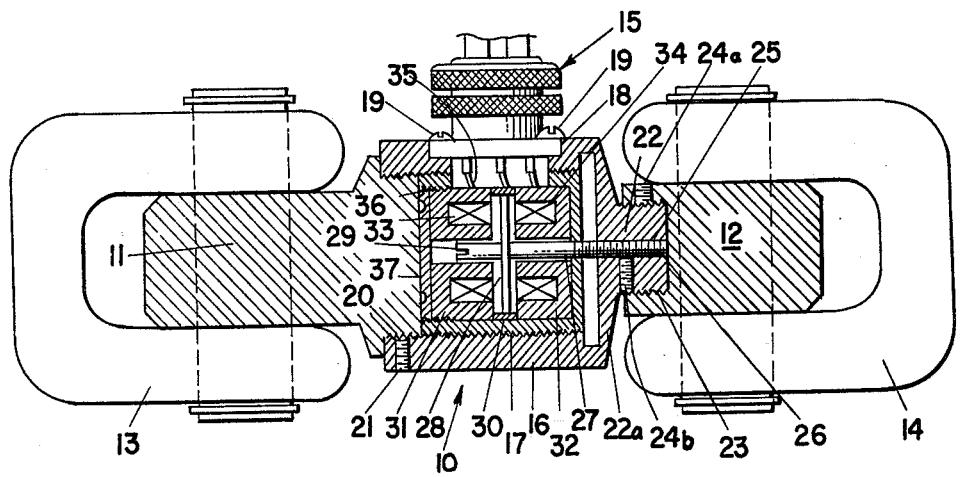

June 11, 1963  I. L. GLERUM  3,092,995

FORCE MEASURING DEVICE

Filed Oct. 28, 1960

INVENTOR.
IRVIN L. GLERUM
BY Elliott & Pastoriza
ATTORNEYS

United States Patent Office 3,092,995
Patented June 11, 1963

3,092,995
FORCE MEASURING DEVICE
Irvin L. Glerum, Canoga Park, Calif., assignor to W. C. Dillon and Company, a corporation of California
Filed Oct. 28, 1960, Ser. No. 65,644
9 Claims. (Cl. 73—141)

This invention generally relates to a measuring device which is designed in one embodiment for obtaining precise measurements of loads or forces, and which may also be employed in another embodiment in conjunction with linear measurement requirements, for example, to perform functions of "go, no-go" gauges and the like.

More specifically, the measuring device of the present invention embodies in one form an electro-magnetic transducer means for converting the elongation or compression of the member into an indication or reading of the force applied; in another construction, the electromagnetic transducer means converts a minute linear movement of a member into an electrical reading.

The present application is a continuation-in-part of applicant's co-pending application entitled "Dynamometer," filed October 6, 1958, Serial No. 765,593, now Patent No. 3,033,032. In the referred to application, a drawing of a preferred electro-magnetic circuit is disclosed, such circuit being equally adaptable to the measuring device of the present invention.

When used in conjunction with loads or forces, the measuring device of the present invention may be employed either in the measurement of compressional loads or forces or in the measurement of tensile loads and forces. For illustrative purposes, however, the specification insofar as this embodiment is concerned will be primarily directed towards the application in which the measuring device is utilized in conjunction with tensile loads.

Similarly, with respect to the embodiment of the measuring device for direct measurement of linear movement of a member, it will be appreciated that the invention according to external structural details may be used in diverse applications.

An object of the present invention is to provide a measuring device which may be economically constructed and manufactured of a minimum number of parts, and yet which is susceptible of being embodied within relatively small overall dimensions while yielding precise measurements under a wide range of loads and other operating conditions.

Another object of the present invention is to provide a measuring device which requires very little adjustment or maintenance during its operating life, and which may be hermetically sealed insofar as its application to the measurements of loads or forces is concerned.

Another object of the present invention is to provide a measuring device which embodies a minimum number of moving parts and which will operate satisfactorily despite severe environmental conditions such as shock, inertial loads and the like.

These and other objects and advantages of the present invention are generally achieved by providing in a measuring device a casing which houses first and second transformer means, with the second transformer means being axially spaced from the first transformer means.

A common armature member for the first and second transforer means is axially interposed between the first and second transformer means, and a shaft axially extends through at least one of the transformer means. The shaft has coupled thereto the armature member, whereby axial movement imparted to the shaft will in turn effect movement of the armature member to in turn effect a change in the output voltages of the first and second transformer means.

As a consequence of such changes in output voltages, a visual indication may be given on an electrical meter which will be proportional to the particular movement imparted to the armature or shaft.

The change in output voltage occurs as a consequence of the armature moving closer to one transformer means and further away from the other transformer means, thereby reducing the air gap in one direction and increasing the air gap in the other direction. As a consequence, the reluctance of the magnetic circuit through the transformer means in which the air gap is decreased is reduced to allow more flux and a greater output voltage; on the other hand, in the other transformer means in which the air gap is increased, the reluctance is correspondingly increased and the flux and output voltage reduced.

The foregoing electrical principles form no part of the present invention and are only presented to explain how the differential transformer means employed cooperates in the overall combination.

Figure 2:
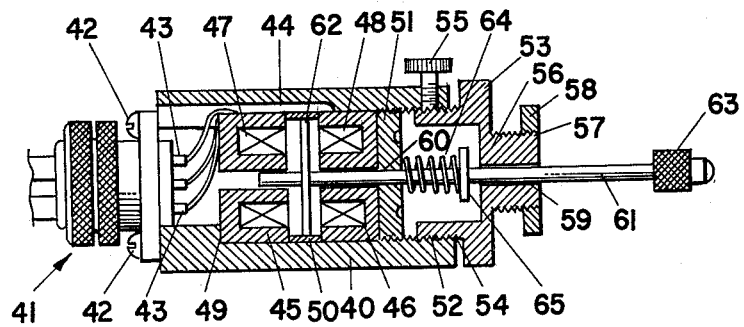

A better understanding of the present invention will be had by reference to the drawings disclosing merely illustrative embodiments, and in which:

FIGURE 1 is a sectional view through the measuring device of the present invention, illustrating an embodiment thereof for use in connection with the measurement of compressive or tensile loads and forces; and, FIGURE 2 is a sectional view through another embodiment of the present measuring device invention illustrating its use in conjunction with linear measurements.

Referring now to the drawings, there is shown in FIGURE 1 an embodiment of a measuring device according to the present invention including a load cell 10 which has coupled thereto at opposing end portions thereof a male pull plug 11 and a female pull plug 12. A shackle 13 is coupled to the pull plug 11 and a shackle 14 is coupled to the pull plug 12. An electrical connector 15 is coupled to the central portion of the load cell 10. In consequence, with the construction of FIGURE 1, the measuring device of the present invention is adapted for use as a precise dynamometer in the measurement of tensile forces. Of course, by eliminating the shackles 13 and 14, the device could be used for the measurement of compressive loads.

The load cell 10 includes a general cylindrical casing 16 which is provided with internal threading 17. The casing 16 defines an aperture 18 in its sidewalls which is counter bored to receive screws 19 coupled to the electrical connector 15 heretofore referred to.

The male pull plug 11 is provided with external threading 20 to connect with the internal threading 17 of the casing 16 as indicated. In order to secure the pull plug 11 relative to casing 16, a set screw 21 may be provided through the casing 16.

For retaining the female plug 12, the casing 16 is closed at one end portion to define an externally threaded boss 22 which is adapted to mate with internal threads 23 provided on the female pull plug 12. A set screw 24a may be provided in conjunction with the pull plug 12 for securing the latter relative to the externally threaded boss 22 of the casing 16.

The boss 22 is provided with an internal axially extending bore 25 which is threaded to receive the threaded end 26 of a stem or shaft member 27. The shaft 27 has coupled thereto a disc-like member 28 or armature, which forms an important part of the present invention. The shaft 27, as such, defines at its opposite free end 29 a slot such that it may be axially adjusted by threading inwardly or outwardly of the bore 25. Again, a set screw 24b may be employed to properly maintain the position of the shaft 27 in the bore 25.

Disposed within the casing 16 is a ring spacer member 30 which is axially interposed between a first transformer means 31 and a second transformer means 32. The transformer means 31 and 32 are provided with central bores to accommodate the shaft 27 and axial movement thereof.

The transformer members 31 and 32 include conventional annular coils 33 and 34, respectively, in which the primaries and secondaries are wound together. Leads 35 have been schematically indicated as connecting with the coils 33 and 34 to in turn connect with electrical terminals (not shown) provided within the electrical connector 15.

The electrical connector 15 may in turn be connected to electrical circuitry of the type illustratively shown in applicant's co-pending application heretofore identified.

The transformer members 31 and 32, as well as the spacer 30, are retained within a sleeve member 36 which is threaded within the casing 16. Of course, the sleeve member 36 is also provided with an opening aligned with the opening 18 in the casing to facilitate the electrical connections. The transformers and spacer are positively secured within the sleeve member 36 by a lock nut 37 which is threadedly coupled within the open end of the spacer 30.

The operation of the improved measuring device according to the present invention may now be described.

In the assembly of the device, the sleeve 36 is first threaded into the casing 16. Thereafter, the transformer 32 is positioned within the casing, then the spacer 30, and thereafter the transformer means 31. Of course, before transformer 31 is placed in the sleeve, the shaft 27 and coupled armature 28 must be positioned therein.

Once this assembly has been completed, the lock nut 37 may be threaded into the sleeve 36 to securely lock the transformer means and spacer in position. Appropriate tool holes may be provided in the outer face of the lock nut 37 for this purpose. The particular position or disposition of the armature or disc 28 as between the opposing pole pieces of the transformers 31 and 32 may be adjusted by varying the number of turns the shaft 27 is threaded into the bore 25 of the boss 22.

With the parts assembled within the casing 16, the electrical connections can be made through the connector 15, and the pull plugs may be coupled to the end portions of the casing and the lock screws properly set.

When a tensile load, for example, is imposed upon the shackles 13 and 14, the portion 22a of the casing 16 will tend to bend outwardly and thus move the shaft or stem 27 axially away from the center of the load cell. As a consequence of such movement, the armature or disc member 28 will move closer to the pole pieces of the transformer 32 to in turn decrease the reluctance and increase the flux of the transformer 32 thereby increasing its output voltage. Inversely, the output voltage of transformer 31 will decrease, whereby the differential voltage measuring means, as described in the heretofore referred to patent application, will give an electrical reading which will be proportional to the force exerted on the shackles 13 and 14.

It has been found through experiment that the portion 22a of the casing 16 elongates or bends in such a manner that the movement of the stem 27 is linear with respect to the forces imposed upon the shackles 13 and 14. Also, by using the differential transformer means as indicated, very sensitive and precise indications of the forces or loads applied can be obtained.

It is to be noted also that the armature 28 is of sufficient thickness such that it will not be saturated and whereby a single member as indicated may be employed for movement between the two transformer means 31 and 32.

In certain instances, it may be desirable to seal the entire interior of the load cell in rubber or similar plastic material which may be readily accomplished in view of the construction used.

In applications in which loads or forces are not to be measured, and in which it is only desired to obtain an indication of linear movement or dimensional measurements, the embodiment of the measuring device may be used as illustratively shown in FIGURE 2.

Referring now to FIGURE 2, there is shown a casing 40 which has coupled thereto at one end thereof an electrical connecting means 41 similar to the connector 15 of FIGURE 1. The connector 41 may be secured with screws 42 and may be provided with lead connectors 43.

In order to accommodate the electrical wires coming from the connector 41, a slotted portion 44 may be provided in the casing 40 such that the wires may pass in an axial direction through the slot 44 to connect with the opposing transformer members 45 and 46. The transformer members 45 and 46, of course, include coils 47 and 48 and are identical in construction to the transformer members shown in FIGURE 1.

Instead of using a transformer retaining sleeve (similar to sleeve 36 of FIGURE 1), the transformer members are mounted directly within the casing whereby the transformer member 45 abuts against a decreased diameter face 49 of the casing 40. The transformer means 45 is spaced from the transformer means 46, by a spacer 50 similar to the spacer 30 as employed in conjunction with the construction of FIGURE 1.

Again, a lock nut 51 may be employed to securely lock the transformer members 45 and 46 and the spacer member 50 within the casing 40. Threading 52 is provided to secure the lock nut within the casing and also functions for coupling an end plug 53 to one end of the casing. The end plug 53 is provided with outer threading 54 for screwing into the threading 52 of the casing 40. In addition, a lock screw 55 is coupled to the casing for securely maintaining the end plug 53 in any given axial position.

The end plug 53 may integrally include a mounting stud 56 which is threaded at 57 to receive a nut 58. With such a construction, the stud 56 may extend through an aperture in a panel, plate, or frame member, and the lock nut 58 may be tightened up against the other side of the panel or member to securely mount the measuring device. Thereafter, by adjustment of the end plug 53 relative to the casing 40, various positions of the measuring device may be obtained according to the needs of the particular application.

The stud 56 is provided with a bore 59, and of course a similar bore 60 is provided in the lock screw 51 which is aligned with bores extending through the transformers 45 and 46 to accommodate the shaft or stem 61. The stem 61 has coupled thereto as in the construction of FIGURE 1, an armature or disc 62 positioned between opposing transformer members 45 and 46. Shaft 61 terminates at its outer end in an anvil 63 which is designed to actuate the shaft 61 inwardly in response to any forces imposed thereon.

In order to maintain the shaft 61 in a given zero position, a spring means 64 is coupled to the shaft 61 and biases the shaft 61 outwardly by pressure exerted against a pin 65 coupled to the shaft 61. Of course, other equivalent biasing means could be employed, and the particular construction shown is merely by way of illustration.

It will be evident that in the embodiment of FIGURE 2, the measurement device functions in exactly the same manner as the embodiment of FIGURE 1 insofar as the general concept is concerned. If the device is to be employed as a "go, no-go" gauge or as a similar measuring instrument in connection with quality control or the like, it will be mounted such that any part passing adjacent to the anvil 63 will not actuate the same as long as it is of the proper dimension. If it exceeds proper tolerances, it will actuate the anvil 63 to in turn cause movement of the armature 62 and vary the output voltage of the respective transformers 45 and 46 with a corresponding scale reading in the electrical meter (not shown) coupled to the connector 41. Of course, the measuring device may be used in other analogous applications.

It will be evident from the foregoing that the measuring device, according to the present invention, embodies only a single moving part comprising the shaft and its coupled armature and that substantially no maintenance is required. Furthermore, it will be evident that the measuring device does not have any parts which will deteriorate under usage and that it may be economically constructed to be precisely responsive and to accommodate a wide range of loads.

Although illustrative embodiments have been shown, it will be appreciated that various modifications and changes may be made without departing from the spirit and scope of the invention as set forth in the following claims.

What is claimed is:

1. A measuring device comprising: a casing; first transformer means coupled within said casing; second transformer means coupled within said casing, said second transformer means being axially spaced from and in opposing relationship to said first transformer means; a common disc shaped armature member for said first and second transformer means axially interposed in spaced relationship between said first and second transformer means; a shaft axially extending through at least one of said transformer means, said shaft having coupled thereto said armature member, whereby axial movement imparted to said shaft will in turn effect movement of said armature member to cause an inverse variation in the magnetic flux of said first and second transformer means, and a corresponding change in the output voltages of said first and second transformer means.

2. In a measuring device, the combination comprising: a casing; first coupling means at one end of said casing; second coupling means at the opposite end of said casing, said first and second coupling means being designed, respectively, for connection to force exerting members; said casing having one integral end portion thereof designed to flex in response to said force; first transformer means coupled within said casing; second transformer means coupled within said casing, said second transformer means being axially spaced from said first transformer means; a shaft axially extending through at least one of said transformer means; a common armature member for said first and second transformer means axially interposed in spaced relationship between said first and second transformer means and coupled for free movement with said shaft, said shaft having one end thereof rigidly secured to said one end portion of said casing, whereby movement imparted to said one end portion of said casing by said force will effect movement of said shaft and said armature to vary the output voltages of said first and second transformer means.

3. In a measuring device, the combination comprising: a casing; first transformer means coupled within said casing; second transformer means coupled within said casing, said second transformer means being axially spaced from said first transformer means; a common disc shaped armature member for said first and second transformer means interposed axially in spaced relationship between said first and second transformer means; a shaft extending through at least one of said transformer means, said shaft being coupled to said armature member, and one end of said shaft extending outwardly of said casing; spring means within but spaced from said casing coupled to and biasing said shaft towards a given direction whereby said armature member is disposed in a given position between said first and second transformer means, and whereby movement of said shaft in an axial direction will vary the voltage output of said first and second transformer means in accordance with the disposition of said armature member.

4. In a measuring device, the combination comprising: a casing; first transformer means coupled within said casing; second transformer means coupled within said casing, said second transformer means being axially spaced from said first transformer means; spacer means interposed between said first transformer means and second transformer means for indexing the relative positions of said first transformer means and said second transformer means; a common armature member for said first and second transformer means axially interposed in spaced relationship between said first and second transformer means, said armature member being spaced radially inwardly of said spacer means; a shaft member extending through at least one of said transformer means, said shaft member having coupled thereto said armature member, whereby movement imparted to said shaft will effect a change in the relative voltage outputs of said first transformer means and said second transformer means.

5. In a measuring device, the combination comprising: a casing; first transformer means coupled within said casing; second transformer means coupled within said casing, said second transformer means being axially spaced from said first transformer means; a shaft having a probe-like outer end extending through one end of said casing and through at least one of said transformer means; a common disc shaped armature member for said first and second transformer means interposed in spaced relationship between said first and second transformer means and mounted on said shaft for movement therewith, whereby movement imparted to said outer end of said shaft will vary the relative voltage outputs of said first and second transformer means.

6. In a measuring device, the combination comprising: a casing; first transformer means coupled within said casing; second transformer means coupled within said casing, said second transformer means being axially spaced from said first transformer means; a shaft coupled to one end portion of said casing, said shaft extending through at least one of said transformer means; a common disc-shaped armature for said first and second transformer means interposed in spaced relationship between said first and said second transformer means and mounted on said shaft for movement therewith; coupling means connected to opposite ends of said casing for connection to force exerting members, one of said coupling means being connected to said one end portion; said casing having an integral portion of said one end portion designed to flex under an axial load, whereby force applied to said one end portion will effect flexing of said casing to in turn effect movement of said shaft and said coupled armature, whereby a voltage variation will occur in the relative outputs of said first and second transformer means.

7. The combination, according to claim 6, in which said first transformer means and said second transformer means are indexed apart by a spacer means.

8. In a measuring device, the combination comprising: a casing; first transformer means coupled within said casing; second transformer means coupled within said casing, said second transformer means being axially spaced from said first transformer means; spacer means indexing said first transformer means and said second transformer means in given positions within said casing; a common armature member for said first and second transformer means interposed between said first and second transformer means; a shaft extending through at least one of said transformer means, said armature member being coupled to said shaft, and said shaft having one end thereof extending outwardly through one end portion of said casing; means coupled to said one end portion of said casing including a mounting nut, said means being axially adjustable to thereby vary the free length of said shaft extending outwardly of said casing; and spring means disposed within said casing and coupled to said shaft urging said shaft in a given direction to in turn urge said armature member to a given position relative to said first transformer means and said second transformer means.

9. In a measuring device, the combination, according to claim 8, and an electrical connector at the end of said casing oppositely disposed of said one end portion.

References Cited in the file of this patent

FOREIGN PATENTS

| | | |
|---|---|---|
| 704,163 | Great Britain | Feb. 17, 1954 |
| 750,445 | Great Britain | June 13, 1956 |
| 778,440 | Great Britain | July 10, 1957 |